United States Patent
Brand

(10) Patent No.: US 10,119,679 B2
(45) Date of Patent: Nov. 6, 2018

(54) FREEFORM OPTICAL SURFACE FOR PRODUCING SHARP-EDGED IRRADIANCE PATTERNS

(71) Applicant: Mitsubishi Electric Research Laboratories, Inc., Cambridge, MA (US)

(72) Inventor: Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 205 days.

(21) Appl. No.: 15/296,162

(22) Filed: Oct. 18, 2016

(65) Prior Publication Data

US 2018/0106459 A1 Apr. 19, 2018

(51) Int. Cl.
| | | |
|---|---|---|
| *F21V 5/04* | (2006.01) | |
| *G06K 9/46* | (2006.01) | |
| *G02B 3/00* | (2006.01) | |
| *G02B 27/09* | (2006.01) | |
| *G02B 27/00* | (2006.01) | |
| *F21Y 115/10* | (2016.01) | |

(52) U.S. Cl.
CPC .............. *F21V 5/04* (2013.01); *G02B 3/0043* (2013.01); *G02B 27/0012* (2013.01); *G02B 27/0927* (2013.01); *G06K 9/4604* (2013.01); *F21Y 2115/10* (2016.08)

(58) Field of Classification Search
CPC ... F21V 5/04; G02B 27/0012; G02B 27/0927; G02B 3/0043; F21Y 2115/10; G06K 9/4604
See application file for complete search history.

(56) References Cited

U.S. PATENT DOCUMENTS

| | | | |
|---|---|---|---|
| 7,460,985 B2 | 12/2008 | Beneitez et al. | |
| 8,851,723 B2 | 10/2014 | Peck et al. | |
| 2005/0086032 A1 | 4/2005 | Benitez et al. | |
| 2005/0231683 A1* | 10/2005 | Ben-Zeev | G02C 7/025 |
| | | | 351/159.75 |
| 2016/0041398 A1 | 2/2016 | Papas | |

FOREIGN PATENT DOCUMENTS

| | | |
|---|---|---|
| EP | 2711745 A2 | 3/2014 |
| EP | 2963464 A1 | 1/2016 |
| WO | 2005012951 A2 | 2/2005 |

OTHER PUBLICATIONS

Yuliy Schwartzburg, Romain Testuz, Andrea Tagliasacchi, and Mark Pauly. High-contrast computational caustic design. ACM Trans. Graph., 33(4):74:1{74:11, Jul. 2014. Proc. SIGGRAPH 2014.
R. Wester et al. Designing optical free-form surfaces for extended sources. Opt. Express, 22(S2):A552{A560, Mar. 2014.

(Continued)

*Primary Examiner* — David V Bruce
(74) *Attorney, Agent, or Firm* — Gennadiy Vinokur; James McAleenan; Hironori Tsukamoto

(57) ABSTRACT

An optic has a freeform optical surface transforming incident light emitted by a zero-étendue light source to form an irradiation pattern including a caustic of light rays focused along a curve. The transverse thickness of the illuminated curve is determined by the diffraction limit of the wavelength of the incident light.

20 Claims, 20 Drawing Sheets

(56) References Cited

OTHER PUBLICATIONS

Yue et al. "Poisson Based Continuous Surgace Generation for Goal Based Caustics." ACM Transactions on Graphics, ACM US. vol. 33, No. 3, Jun. 2, 2014. pp. 1-73.
Glimm et al. "Optical Design of Two Reflector Systems, The Monge Kantorovich Mass Transfer Problem and Fermats Principle." ARXIV. org. Cornell University Library, 201 Olin Library Cornell Univ. Ithaca, NY 14853. Mar. 31, 2003.
Wu et al. "Mathematical Model of the Single Freedorm Surgace Design for Collimated Beam Shaping." Optics Express, vol. 21, No. 18. Aug. 30, 2013, p. 20974.

* cited by examiner

Initialize:

1. Finely divide the radiant sphere into patches.
2. Let $\Phi_i$ be the flux through patch $i$.
3. Let $t_j$ be the desired irradiance on $j^{th}$ caustic.
4. Derive $h_{ij}(v_j)$ = height function of $j^{th}$ lens at center of $i^{th}$ patch.
5. Define $s_{ij} = \exp \beta h_{ij}(v_j) / \Sigma_k \beta h_{ik}(v_k)$ with $s_{ij} \approx 1$ iff $j^{th}$ surface is outermost at $i^{th}$ patch.

Iterate:

6. Minimize $E(\mathbf{v}) = \Sigma_j (t_j - \Sigma_i s_{ij} \Phi_i)^2$ via gradient descent. $\partial E(\mathbf{v})/\partial v_i$ has simple form in terms of $s, h, h'$.

FIG. 10C

FREEFORM OPTICAL SURFACE FOR PRODUCING SHARP-EDGED IRRADIANCE PATTERNS

FIELD OF THE INVENTION

This invention relates to optics, and more specifically to optics having a freeform optical surface transforming incident light to produce an irradiation pattern.

BACKGROUND

The field of non-imaging optics has long sought a method to design optical surfaces that transform an incident light emitted by a light source into an arbitrary irradiation pattern. In the last two decades, substantial progress has been made for the zero-étendue case, an idealization where light rays are exactly parallel or exactly diverging from a single point. This idealization allows a one-to-one correspondence between rays in the emitted light and rays in the target irradiation pattern. This one-to-one correspondence reduces the design problem to determining an optical surface whose reflections or refractions implement a one-to-one mapping between the spatial density of rays in a cross-section of the emitted light and the spatial density of rays in the target irradiation pattern. If a smooth mapping is possible between the initial and target densities, which is almost always the case for the zero-étendue systems, then that mapping can be found using the methods borrowed from the field of optimal mass transport. The resulting optics can produce very complicated irradiation patterns, for example, projecting photographic images. These optical surfaces are generally denoted as freeform optical surfaces, simply because their shapes are more complicated that any of the simple algebraic surfaces typically associated with lenses and mirrors.

In reality, the zero-étendue light source is not practical. Practical light sources, e.g., light-emitting diodes (LED), have spatial extent, i.e., light rays are emitted from an area, not a point, and these rays cross during their propagation, making one-to-one mappings impossible, and pushing the problem outside the scope of what optimal mass transport can solve. If a freeform optical surface is illuminated by a spatially extended light source, the resulting irradiation pattern is significantly blurred, much as a shadow on a cloudy day becomes soft and indistinct. According to the second law of thermodynamics, this blurring is inescapable, so freeform optics for spatially extended light sources are typically designed to achieve approximately uniform illumination in some bounded area surrounded by soft blurry illumination fall-offs.

For example, a method of simultaneous multiple surfaces (SMS) achieve uniform illumination by directing rays of light from the edge of a spatially extended light source to desired target points. In such a way, the rays of light form some unknown but acceptable density; however, the edges of the resulting irradiation pattern are still blurred.

Another method pre-compensates for the blurring action of the extended light source by estimating an optical surface that produces an approximately deblurred illumination pattern when illuminated with a point light source. When such a pattern is illuminated with the extended light source, the blurring and deblurring approximately cancel out. However, for some illumination patterns, the cancellation is not exact.

Therefore, there is a need for an optic that can transform incident light from the spatially extended light source into a target irradiation pattern with sharp edges. However, such an optic can be beneficial for a number of optical applications, such as optics for signage illumination and optics for headlight of a vehicle.

SUMMARY

Some embodiments are based on recognition that growth of étendue is one of the problems in transforming incident light into different structured irradiation patterns, such as the irradiation patterns having sharp-edge boarders. Étendue is the optical analogue of entropy; it is the uncertainty about the direction of light rays passing through a region of space, or equivalently, the uncertainty about the position of rays having a certain direction. To that end, the étendue is the reason why beams formed from an extended light source look blurry. In conventional structured-illumination devices such as projectors and gobos, étendue is managed partly through light-wasting obstacles such as shutters and apertures.

Some embodiments are based on realization that the growth of étendue is reduced when light is focused to one-dimensional curves. A one-dimensional curve can be formed by a caustic of light rays focused along the curve. In such a manner, the spreading of light is minimized except as needed to draw the desired curves. For example, when an optic is illuminated by a zero-étendue light source, the incident light emitted by a zero-étendue light source forms an irradiation pattern including a caustic of light rays focused along a curve that has negligible width and depth, e.g., the width and/or the depth of the illuminated curve is less than a wavelength of the incident light. However, when the zero-étendue light source is replaced with a spatially extended light source, the resulting curve has an increased width or depth, but still has the sharp-edge boarders preventing spilling of the light outside of the curve and/or irradiation pattern.

To that end, some embodiments are based on recognition that an irradiation pattern can include one or multiple curves forming at least one or a combination of a pictogram, an ideogram, a sign, a glyph, a word and other patterns such as an irradiation pattern forming an asymmetrical low-high beams pattern for illumination of a road surface. When such irradiation pattern is produced from light illuminated by the spatially extended light source, the resulting irradiation pattern includes thicker curves with sharp-edge borders.

Some embodiments are based on recognition that the illuminated curves can be of different types. For example, the curve can extend in a plane over the entire length of the curve, can propagate through a three-dimensional space and/or lie on a surface of a three-dimensional geometrical object. In such a manner, different embodiments can accommodate different types of projection surface, including flat, convex and/or disjoined surfaces.

Some embodiments are based on recognition that it is possible to produce a connected set of focused light spots, i.e., the caustics focused on a point, through reflection or refraction of the optical surface. For example, a Cartesian oval lens projects a point light source to a point caustic. Moreover, some embodiments are based on realization that using a Fermat invariant, the point caustic can be spatially extended to form an arbitrarily curve caustic. For example, the freeform optical surface that produces a curve caustic can be formed by a surjection mapping 2D sheets of a space surrounding the optical surface to corresponding 0D points on the curve using a Fermat invariant governing the propagation of the incident light.

Some embodiments are based on another recognition that when the optic is designed using the Fermat invariant, the irradiation, i.e., brightness, of different segments of the curve can be non-uniform and/or vary arbitrarily. However, when the freeform optical surface is formed by a combination of shapes, the irradiation of different segments of the curve can be controlled via controlling the protuberance of the associated shapes. To that end, in some embodiments, the freeform optical surface is formed by a plurality of shapes adjusted to balance irradiance on each segment of the irradiation pattern.

Accordingly, one embodiment discloses an optic having a freeform optical surface transforming incident light emitted by a zero-étendue light source to form an irradiation pattern including a caustic of light rays focused along a curve, wherein the transverse thickness of the illuminated curve is determined by the diffraction limit of the wavelength of the incident light.

Another embodiment discloses a luminaire having above-mentioned optic and a spatially extended light source arranged in the luminaire to emit the light onto the freeform optical surface to produce the irradiation pattern with the curve with increased width or depth and with sharp-edge boarders preventing spilling of the light outside of the irradiation pattern.

Yet another embodiment discloses a method for fabricating a diffraction-limited optic including determining a freeform optical surface transforming incident light into an irradiation pattern including a caustic of light rays focused along a curve, wherein, were the freeform optical surface to be illuminated by a hypothetical zero-étendue monochromatic light source, the transverse thickness of the illuminated curve is the size of an Airy disk at the wavelength of the incident light, and wherein, when the freeform optical surface is illuminated by a spatially extended light source, the illuminated curve has sharp-edge borders preventing spilling of the light outside of the irradiation pattern; and fabricating the optic having the freeform optical surface.

BRIEF DESCRIPTION OF THE DRAWINGS

FIG. 10C is a pseudo code of the optimization method for balancing irradiation of the irradiation pattern according to one embodiment;

DETAILED DESCRIPTION

Figure 1A:
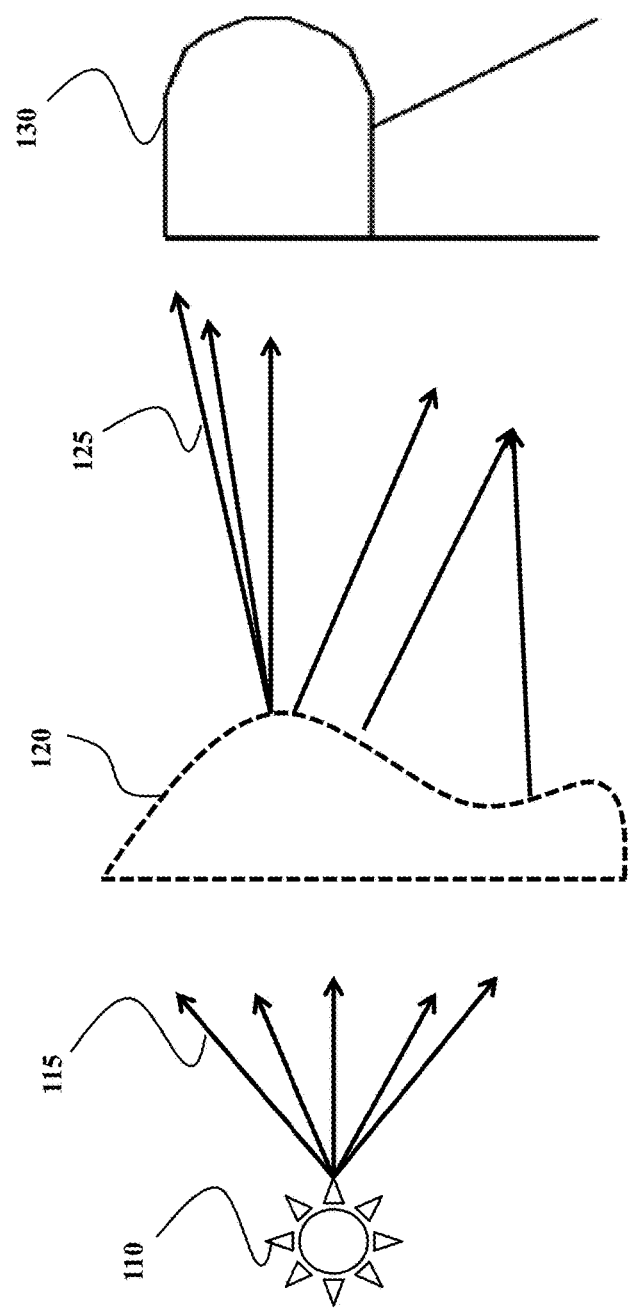
FIG. 1A and FIG. 1B are schematics illustrating the reduction of the growth of étendue according to some embodiments.
Figure 1B:
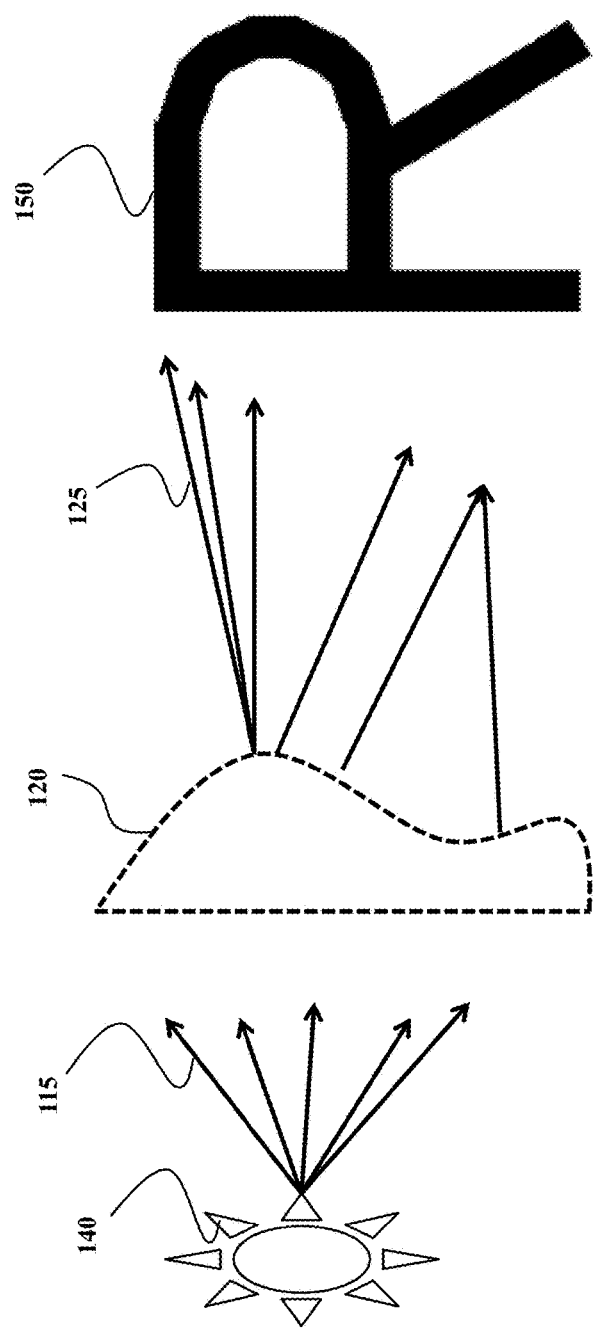

FIG. 1A and FIG. 1B show schematics illustrating the reduction of the growth of étendue according to some embodiments. Specifically, the growth of étendue can be reduced when light is focused to irradiate curves. For example, when an optic 120 is illuminated by a zero-étendue light source 110, the incident light 115 emitted by a zero-étendue light source forms 125 an irradiation pattern 130 including a caustic of light rays focused along a curve that has negligible width and depth, e.g., the width and/or the depth of the curve is less than a wavelength of the incident light.

However, as shown in FIG. 1B, when the zero-étendue light source 110 is replaced with a spatially extended light source 140, the resulting curve has an increased width or depth, but still has the sharp-edge boarders preventing spilling of the light outside of the curve and/or irradiation pattern 150.

To that end, an optic according to various embodiments, has a freeform optical surface transforming incident light emitted by a zero-étendue light source to form an irradiation pattern including a caustic of light rays focused along a curve. In some embodiments, the transverse thickness of the illuminated curve is the same size as an Airy disk produced by perfectly focused light of the wavelength of the incident light. In optics, the Airy disk and Airy pattern are descriptions of the best focused spot of light that a perfect lens with a circular aperture can make, limited by the diffraction of light.

To that end, in one embodiment, the transverse thickness of the illuminated curve is determined by the diffraction limit of the wavelength of the incident light. The diffraction limit is the smallest feature that can be resolved by an optical system. The diffraction limit depends on the physical media that the light propagates through, the geometry of the optical path, and the wavelength of the light. For example, the diffraction limit and/or the width and the depth of the curve are usually less than the wavelength of the incident light. In some highly precise applications, the diffraction limit can be less than a micron.

Figure 2:
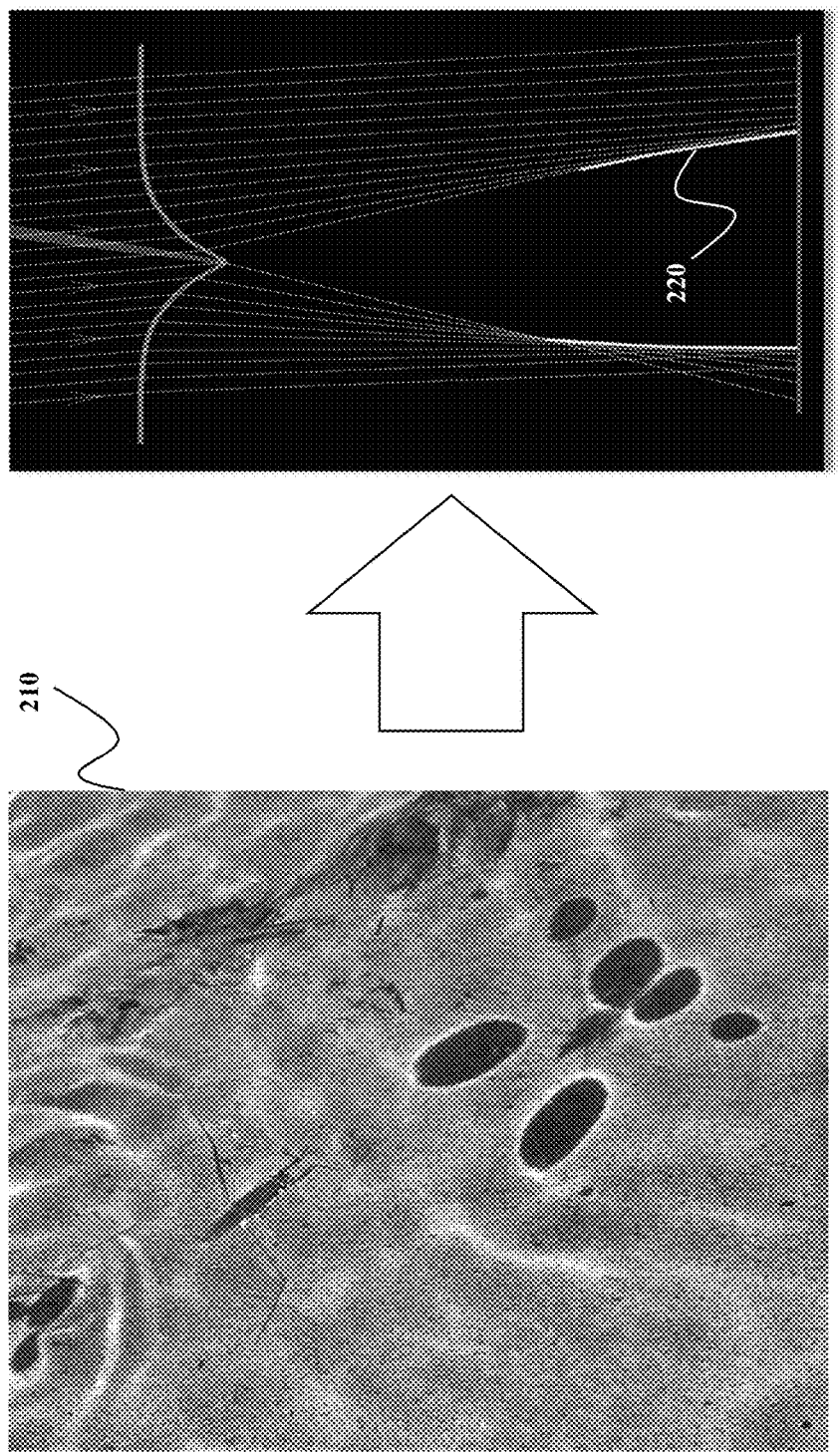
FIG. 2 is a schematic illustrating the principles of forming a one-dimensional curve by a caustic of light rays used by some embodiments.

FIG. 2 shows a schematic illustrating the principles of forming a one-dimensional curve by a caustic of light rays focused along the curve. In optics, a caustic is the envelope of light rays reflected or refracted by a curved surface or object, or the projection of that envelope of rays on another surface. Concentration of light, especially sunlight, can burn. The word caustic, in fact, comes from the Latin "causticus," i.e., burning.

For example, in a photo 210, the water strider (upper left) bends the surface of the water, producing caustics which are visible on the sandy bottom as the bright rims of light around the dark spots. The caustics are illumination discontinuities caused when the wave-front folds or collapses. In a geometric interpretation of the water strider example, the water strider's leg deforms the water surface, which causes rays of light to bend. The caustics are the envelope (union) 220 of the points where rays cross their neighboring rays. That envelope becomes visible where the union 220 of the points meet the sandy bottom, because the light is focused at that intersection.

Some embodiments are based on recognition that growth of étendue is one of the problems in transforming incident light into different structured irradiation patterns, such as the irradiation patterns having sharp-edge boarders. Étendue is the optical analogue of entropy; it is the uncertainty about the direction of light rays passing through a region of space, or equivalently, the uncertainty about the position of rays having a certain direction. To that end, the étendue is the reason why beams formed from an extended light source look blurry.

Some embodiments are based on realization that the growth of étendue is reduced when light is focused to one-dimensional curves. A one-dimensional curve can be formed by a caustic of light rays focused along the curve. In such a manner, the spreading of light is reduced except as needed to draw the desired curves. To that end, some embodiments are based on recognition that the optic can transform the incident light to form an irradiation pattern that can include one or multiple curves.

As used herein, a curve is similar to a line but need not be straight or smooth. A curve is a generalization of a line, in that curvature is not necessarily zero. When the optic is illuminated by a zero-étendue light source, the curves of the formed irradiation pattern have negligibly small width and/or depth. When such irradiation pattern is produced from light illuminated by the spatially extended light source, the resulting irradiation pattern includes thicker curves with sharp-edge boarders.

FIG. 3A-3D show different types of the curves formed according to different embodiments. For example, in one embodiment of FIG. 3A, the curve 310 extends in a plane over the entire length of the curve. Such an embodiment is beneficial when there is a need to project the irradiation pattern on a flat screen or a projection surface. In another embodiment of FIG. 3B, the curve 320 extends through a three-dimensional space. For example, the curve includes at least two segments lying on different planes. Such an embodiment is beneficial when there is a need to project the irradiation pattern on a disjoined projection surface.

Figure 3A:
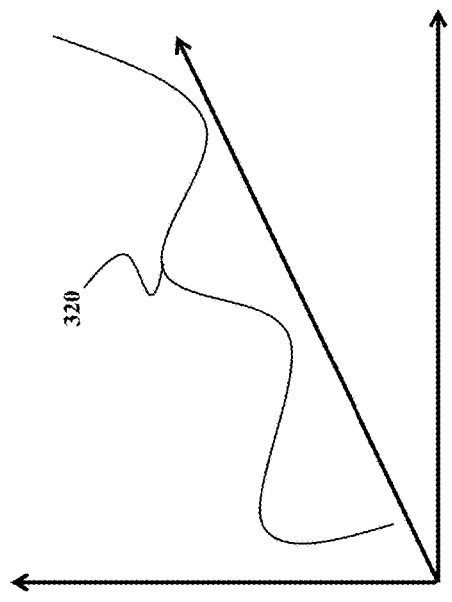
FIGS. 3A, 3B, 3C, and 3D are examples of different types of the curves formed according to different embodiments.
Figure 3B:
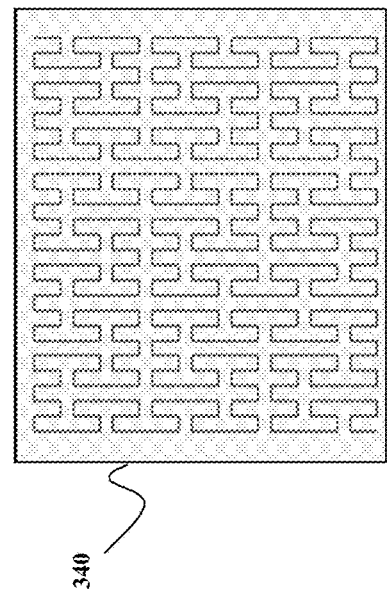
Figure 3C:
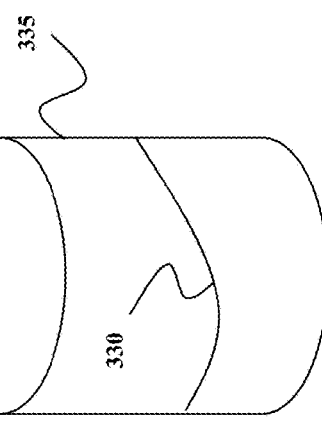

In another embodiment of FIG. 3C, the curve 330 lies on a surface of a three-dimensional geometrical object 335. For example, the object 335 can be an architectural structure, such as a convex wall of a building or a column in a parking garage, and the embodiment can accommodate different irradiation patterns tuned for different shapes of the projection surface.

Figure 3D:
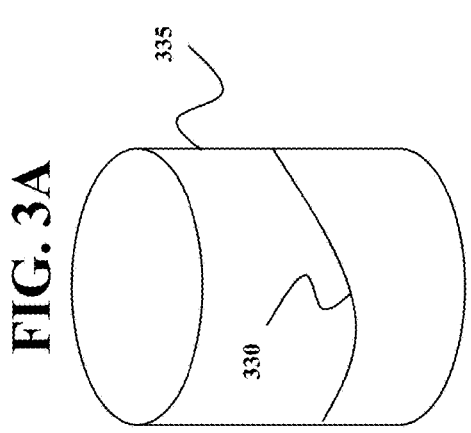

To that end, the shape of the curve along its length can vary. For example, the shape can be continuous or discontinuous. The shape of the curve can be defined by a mathematical function or be arbitrarily. For example, FIG. 3D shows a space filling curve 340. The curve 340 illustrates the Peano curve, but other space-filling curve constructions are possible.

Additionally or alternatively, the irradiation pattern can include multiple curves forming at least one or a combination of a pictogram, an ideogram, a sign, a glyph, a word and other irradiation patterns such as an irradiation pattern forming an asymmetrical low-high beams pattern for illumination of a road surface. When such irradiation pattern is produced from light illuminated by the spatially extended light source, the resulting irradiation pattern includes thicker curves with sharp-edge boarders.

Figure 4C:
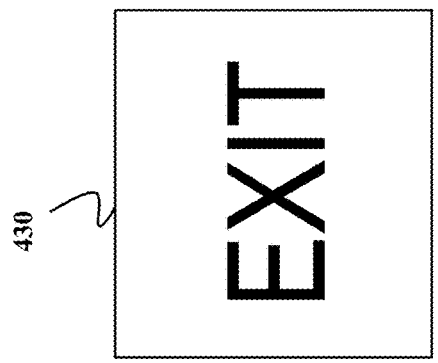
FIGS. 4A, 4B, 4C and 4D are different non-limiting examples of various irradiation patterns produced by some embodiments.
Figure 4B:
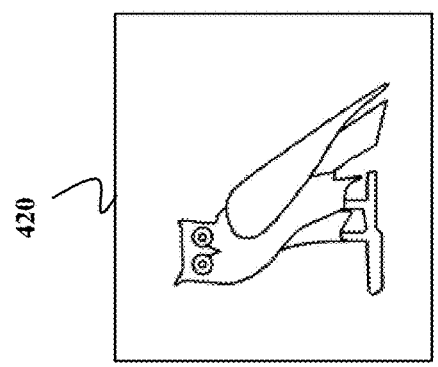
Figure 4A:
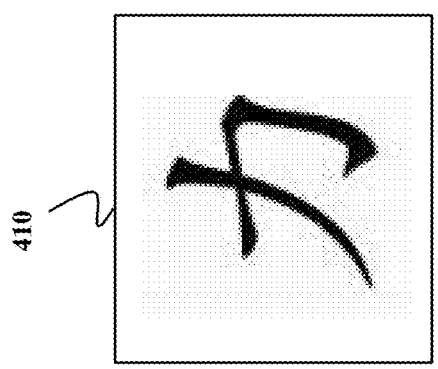
Figure 4D:
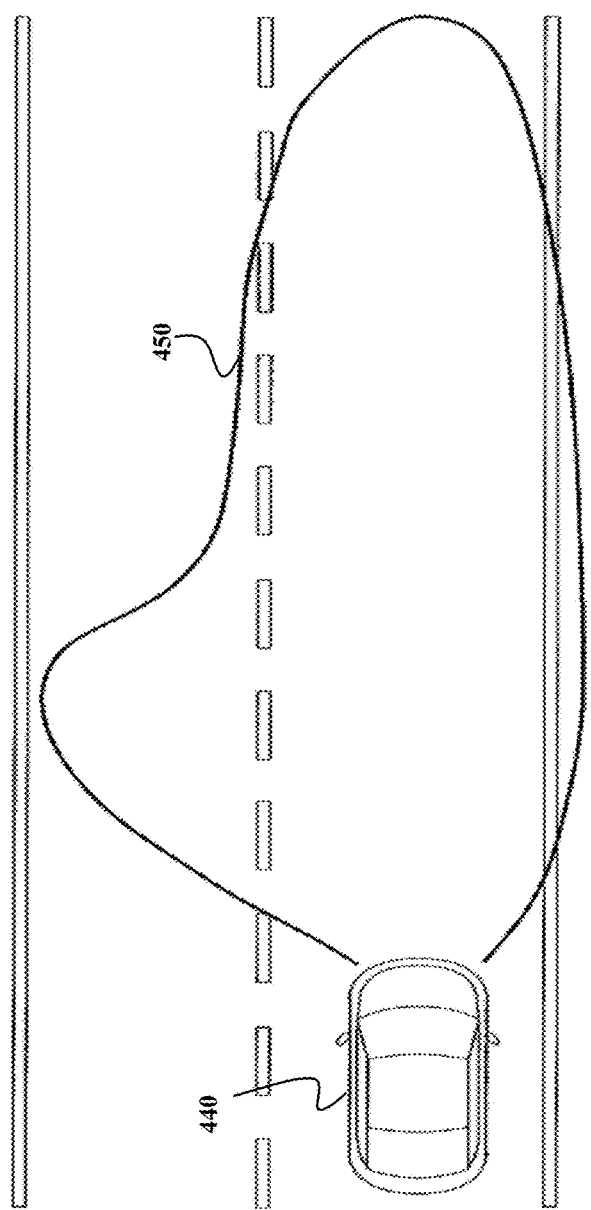

For example, FIG. 4A shows an irradiation pattern including a glyph 410. FIG. 4B shows an irradiation pattern including a pictogram 420. FIG. 4C shows an irradiation pattern including letters forming a word 430. FIG. 4D shows an asymmetrical low-high beams pattern 450 for illumination of a road surface by a headlight of a vehicle 440.

Figure 5A:
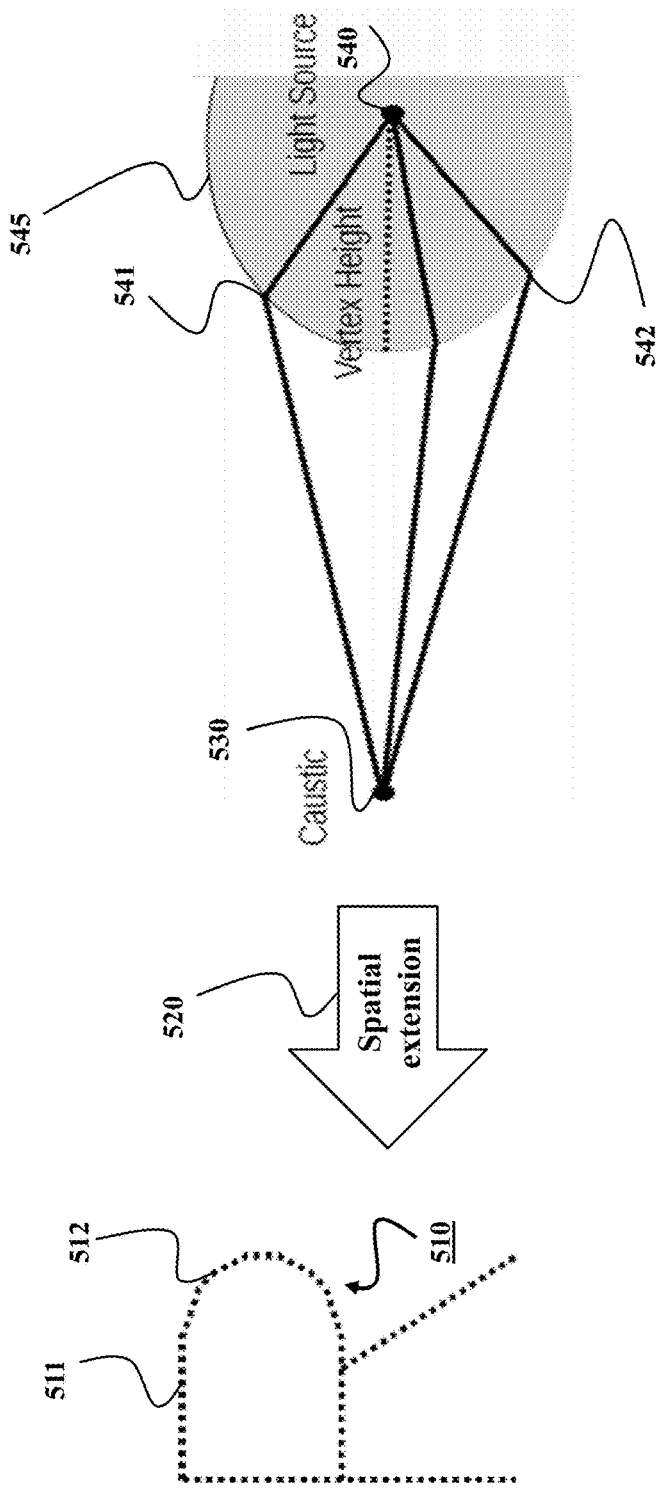
FIG. 5A is a schematic of a spatial extension of a point caustic to form a curve caustic used by some embodiments.

FIG. 5A shows a schematic of a spatial extension of a point caustic to form a curve caustic used by some embodiments. Some embodiments are based on recognition that it is possible to produce focused light spots, i.e., the caustics focused on a point 530, through refraction of the lens. For example, a Cartesian oval lens 545 projects a point light source 540 to a point caustic 530. According to a principle of Fermat invariant, all light rays experience the same optical path length including a combination of a path though the length and a path through the air are focus at the same point. To that end, by varying the shape of the lens, i.e., the height of the vertexes 541 and 542, the rays can be redirected to focus on different points.

Some embodiments are based on recognition that a curve, such as a curve 510, is formed by a set of points. To that end, the principles of the Cartesian oval lens 545 can be spatially extended to focus the light not on one but on multiple points, e.g. points 511 and 512. In such a matter, the shape of the lens 545 is transformed over a function of the vertex height to focus lights on the point of the caustic of the curve.

Figure 5B:
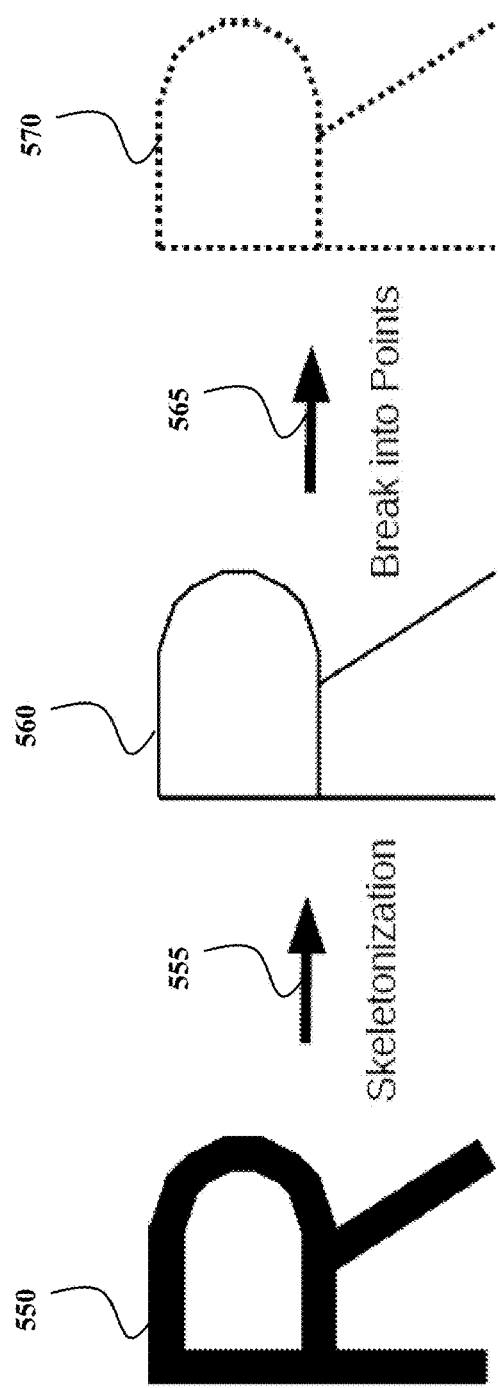
FIG. 5B is a schematic of transforming the desired irradiation pattern into a set of points served as an input to design the optic according to some embodiment.

FIG. 5B shows a schematic of transforming the desired irradiation pattern 550 into a set of points 570 served as an input to design the optic according to some embodiment. For example, the desired irradiation pattern 550 can be processed by any image-processing operation, such as a sckeletonization 555, that shrink the irradiation pattern 550 into a collection of curves 560. In digital image processing, the sckeletonization 555 can be produced using morphological operators to determine medial axis of irradiation pattern 550, which is the set of all points having more than one closest point on the boundary of irradiation pattern 550. Examples of such an image-processing operation include one or combination of a deblurring, a thresholding, a morphological sckeletonization, and a contour-extraction operation.

After the sckeletonization, the resulting collection of curves is partitioned into a set of points and the vertices of the lens are determined to focus the incident light on those points. For example, one embodiment determines the portion of the lens focusing on specific points separately. Such a lens includes a constellation of sometimes disjoined shapes.

Figure 6A:
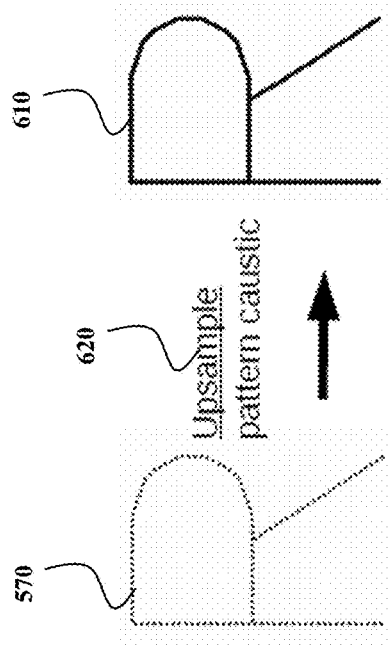
FIG. 6A and FIG. 6B are schematics of interpolation techniques used by some embodiments to smooth the final shape of the optic.
Figure 6B:
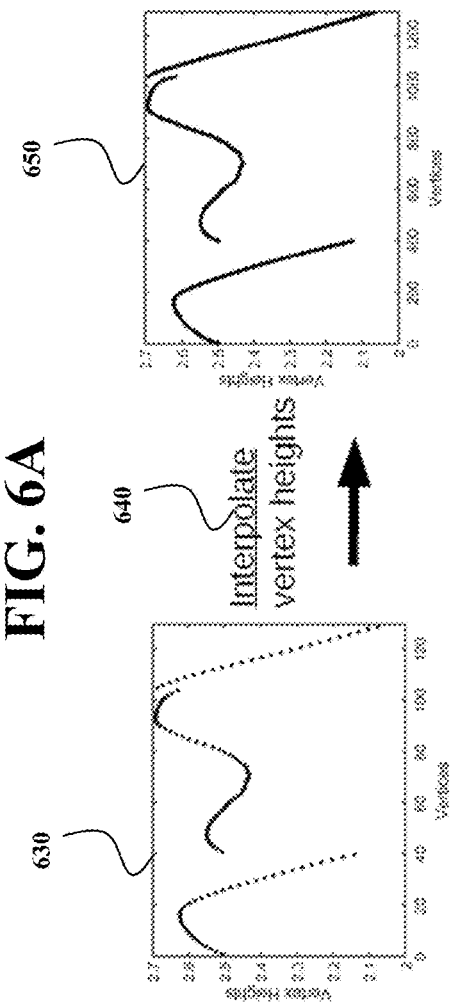

FIG. 6A and FIG. 6B show schematics of interpolation techniques used by some embodiments to smooth the final shape of the lens and to reduce the computational and fabrication burden. This embodiment is based on recognition that the if the set of points 570 can be upsampled 620 to form a smooth curves 610, the discrete set of vertex heights 630 determined for the set of points can be interpolated 640 to form a smooth function 650. Such a smooth vertex heights variations can simplify the fabrication of the desired optics.

Fermat Invariant

Figure 7:
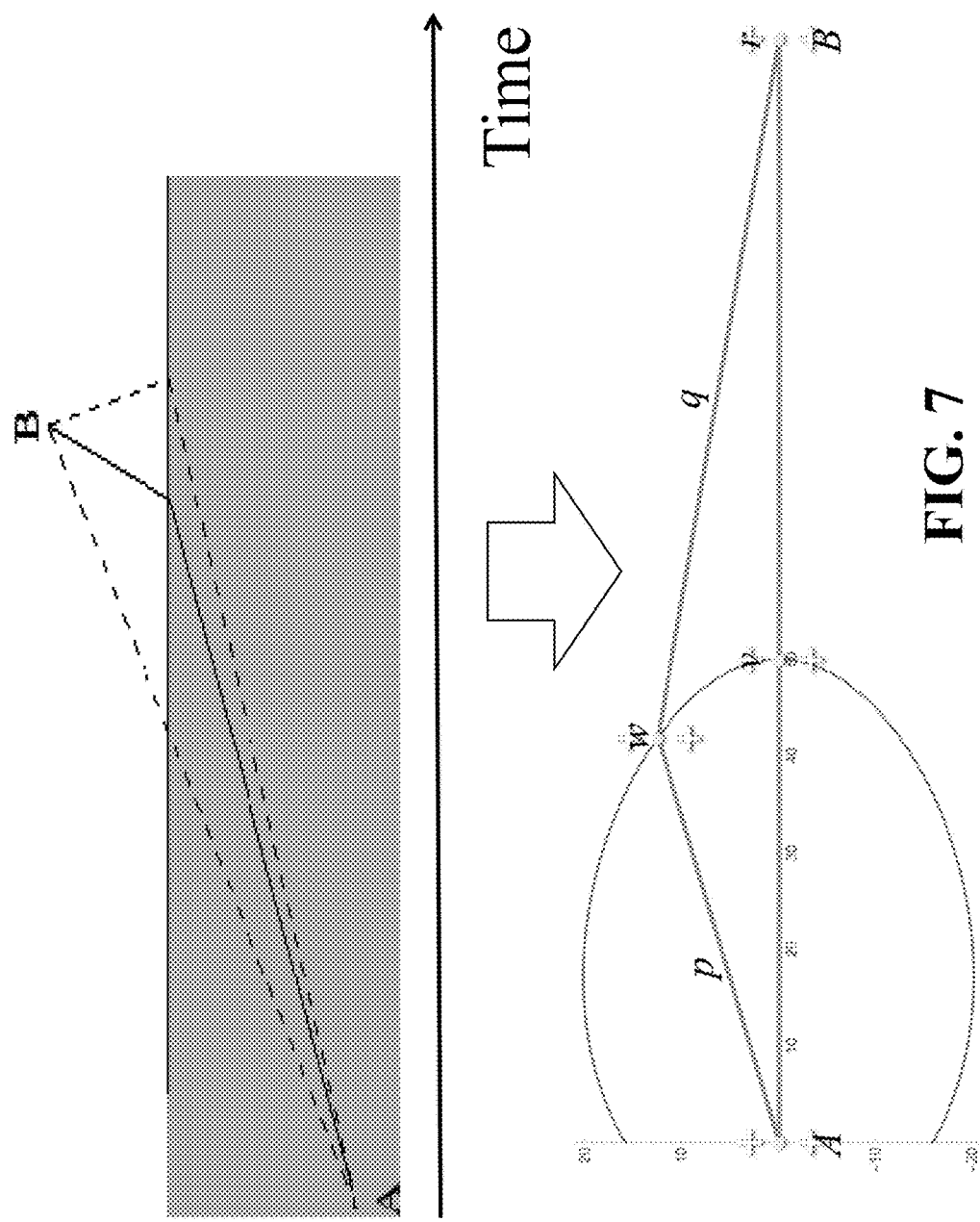
FIG. 7 is a schematic illustrating a principle of Fermat's invariant used by some embodiments.

FIG. 7 shows a schematic of the principle of the Fermat's invariant used by some embodiments. The Fermat's invariant states that the path taken by light is a stationary point of the system Hamiltonian. According to the principle of the Fermat's invariant, photons of the incident light prefer a path from A to B whose total travel time is unchanged by small perturbations. Usually this is a minimum-time path. To that end, one can design a lens that perfectly focuses monochrome light emitted from point A onto point B by finding all paths that take the same amount of time. For example, light travels slowly through the lens from A to v, then fast through the air from v to B. The path pq takes the same amount of time (less lens, more air), therefore the point w of the path pq is also on the surface of the lens.

To that end, some embodiments are based on realization that using a Fermat invariant, the point caustic can be spatially extended to form an arbitrarily curve caustic. For example, the freeform optical surface that produces a curve caustic can be formed by a surjection mapping 2D sheets of a space surrounding the optical surface to corresponding points on the curve using a Fermat invariant governing the propagation of the incident light.

Figures 8A, 8B:
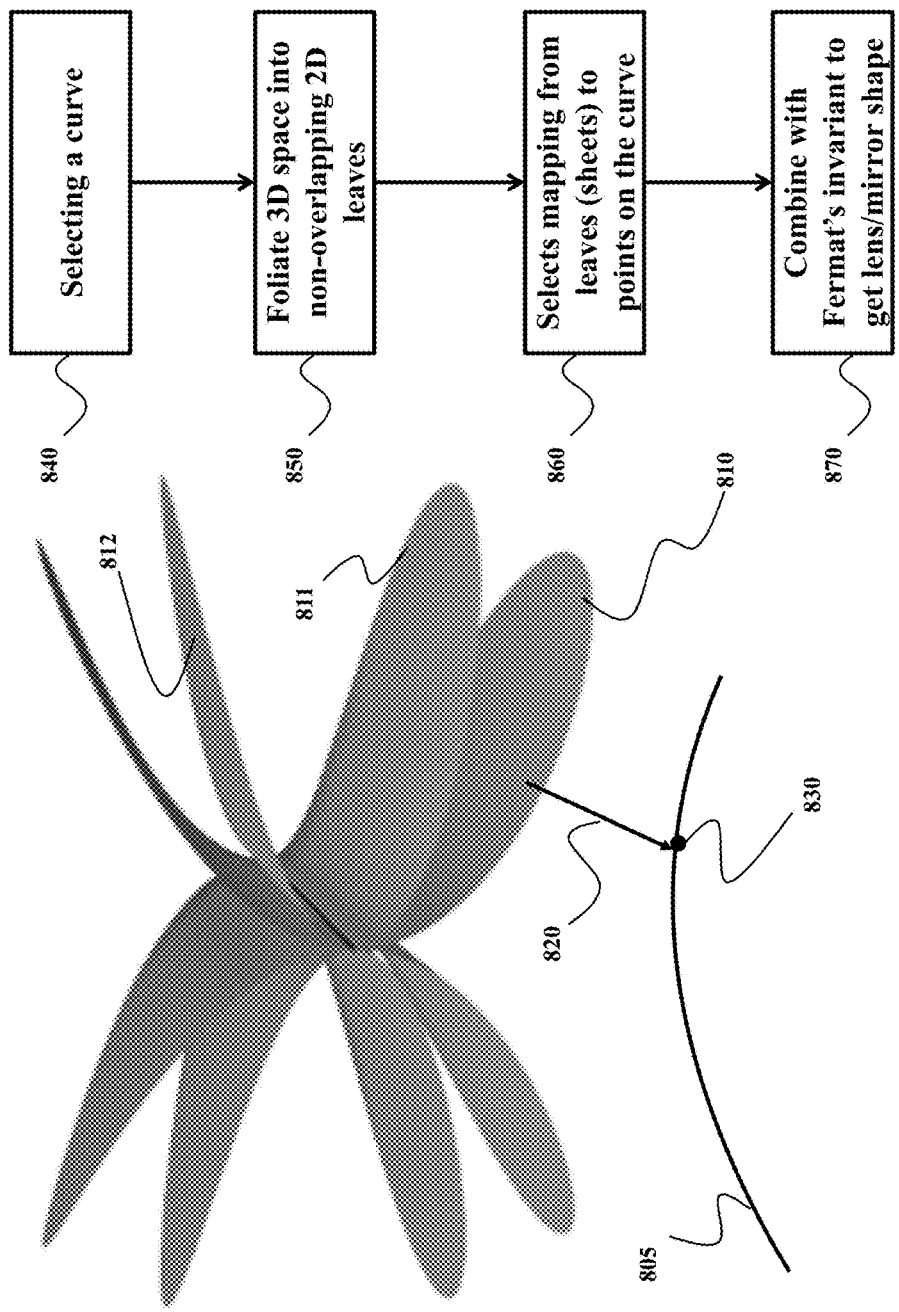
FIGS. 8A and 8B are a schematic and a flow chart of a method for foliating the space surrounding the curve to determine the freeform optical surface of an optic according to some embodiments.

FIGS. 8A and 8B show a schematic and a flow chart of a method for foliating the space surrounding the curve to determine the freeform optical surface of an optic according to some embodiments. After a curve 805 is selected, e.g., according to a specification of a desired irradiation pattern, the 3D space of the curve is partitioned of foliated 850 to form a set of leaves or sheets 810, 811, 812. The partition can vary for different embodiments and can be discrete or continuous, e.g., specified as a function.

Next, the embodiment determines 860 a mapping 820 between a sheet, e.g., the sheet 810, and a point on the curve, e.g., the point 830. The mapping provides the surjection that maps sheets of a space surrounding the optical surface with corresponding points on the curve. According to the mapping, any point of the freeform surface of the optic lying on the specific sheet of space, e.g., the sheet 810, focuses the light to a mapped point on the curve, e.g., the point 830. The way to ensure such a mapping in the resulting shape of the optic is through the Fermat invariant governing the propagation of the incident light.

The Fermat invariant draws a correspondence between the path taken by light and the stationary points of the system Hamiltonian. In the case of a photon crossing an interface from one constant-density medium to another, this means the total travel time is invariant along the interface. For refraction the coordinate-free invariant is $$np+q=nv+(r-v)=(n-1)v+r,\qquad(1)$$

where n>0 is the ratio of the refractive indices in the two media; p≤0 is the distance from the start point to a point at the interface in medium 1; q≤0 is the distance from that point to the end point in medium 2; r>0 is the straight line distance from the start to the end point; and v≥0 is the distance in medium 1 to the interface along this line. For reflection, the invariant takes the simpler form $$p+q=r+2v.\qquad(2)$$

To obtain the geometry of a caustic-forming interface, some embodiments parameterize the geometry in some preferred coordinate system, placing the start point at the origin, and the end point anywhere along the desired caustic.

Then select a univariate surjective mapping from the entire space to the caustic space curve, of the form $$\{x,y,z\} \to \{f(t), g(t), h(t)\} \text{ for } t=t(x,y,z).\qquad(3)$$

The surjection associates a unique 2D sheet of space with each point t on the space-curve. Where optical surface intersects this sheet, the sheet directs the light to that point. Substituting the surjection of equation (3) into the parameterized Fermat invariant directly yields the exact shape of the desired interface as an implicit surface.

For example, to refract a line caustic in Cartesian coordinates, the interface (respectively, caustic) is the locus of points $\{x,y,z\} \in R^3$ (respectively, $\{f(t),g(t),h(t)\} \in R^3$) satisfying the surjection f(t)=t=kx, g(t)=0, h(t)=r. Combining this with 1 yields the parameterized invariant $$n\|\{0,0,0\}\|+\|\{x,y,z\}\|+\|\{x,y,z\}-\{kx,0,r\}\|=(n-1)v+r,\qquad(4)$$

where $\|\cdot\|$ is the Euclidean distance norm. A refractive surface satisfying equation (4) produces a straight line-segment caustic k lens-widths long (neglecting TIR losses at the endpoints) r units from the origin. Choosing $h(t)=\sqrt{r^2-(kx)^2}$ will curve the line segment curve in depth so that it arcs around the radiant (which lessens TIR losses).

The curve caustics of different shapes, lengths, positions, orientations, and intensity distributions can be obtained through other choices of the mapping {f,g,h}. For example, a constant {f,g,h} recovers Cartesian ovals (hyperboloids for r→∞) and, in reflection, ellipsoids (paraboloids for r→∞). If f,g,h are algebraic, the parameterized invariant is a radical equation that can be made purely polynomial by radical elimination—repeatedly isolating one radical term and raising both sides to its inverse power. For example, the straight line-segment caustic yields a quartic; its arced variant yields an optic. The gradient of the resulting polynomial specifies the surface normal in a convenient form for ray tracing and manufacture.

Some embodiments write the invariant in spherical or cylindrical coordinates, e.g., to obtain ring caustics or caustics on curved surfaces. In other embodiments, polar coordinates can be eliminated. For example, to produce exactly ¾ of a circular arc of radius a, the surface-to-caustic map can be parameterized $$\{x, y, z\} \to \{f(t) = a\cos t, g(t) = a\sin t, h(t) = r\},$$

$$t(x, y, z) = \frac{3}{4}\tan^{-1}\frac{y}{x},$$

which has an algebraic representation $$f^2, g^2 = \frac{1}{2} \pm \frac{1}{2\sqrt{2}}\left((x^2 - 3xy^2)(x^2 + y^2)^{-3/2} + 1\right)^{1/2}.$$

Trigonometric parametric curves are easily handled by specifying how light is gathered. For example, to form a lemniscate caustic f, g=acos² t, asintcos² t, one embodiment makes the identification $ux/\sqrt{(u^2x^2+y^2)}\to\cos t$ and $y/\sqrt{(u^2x^2+y^2)}\to\sin t$ to gather light from all equi-azimuthal rays to single points on the caustic (the variable u>0 allows to select the intensity of light along the caustic), which yields a 16th degree polynomial.

Constellation of Shapes

Using the Fermat invariant, some embodiments can accurately determine the free-form surface of a lens that produces individual space-curve caustics. In a number of situations, the irradiation patters include a constellation of distinct curves. One embodiment combines different shapes determined for different curve caustic into a single optical surface that includes a constellation of shapes. However, such a constellation of shapes can yield an optic that produces an uneven irradiation pattern with some caustics appearing very bright and some appearing deem. To that end, some embodiments adjust the plurality of shapes of the constellation to balance irradiant of the light on each part of the irradiation pattern.

Figure 9:
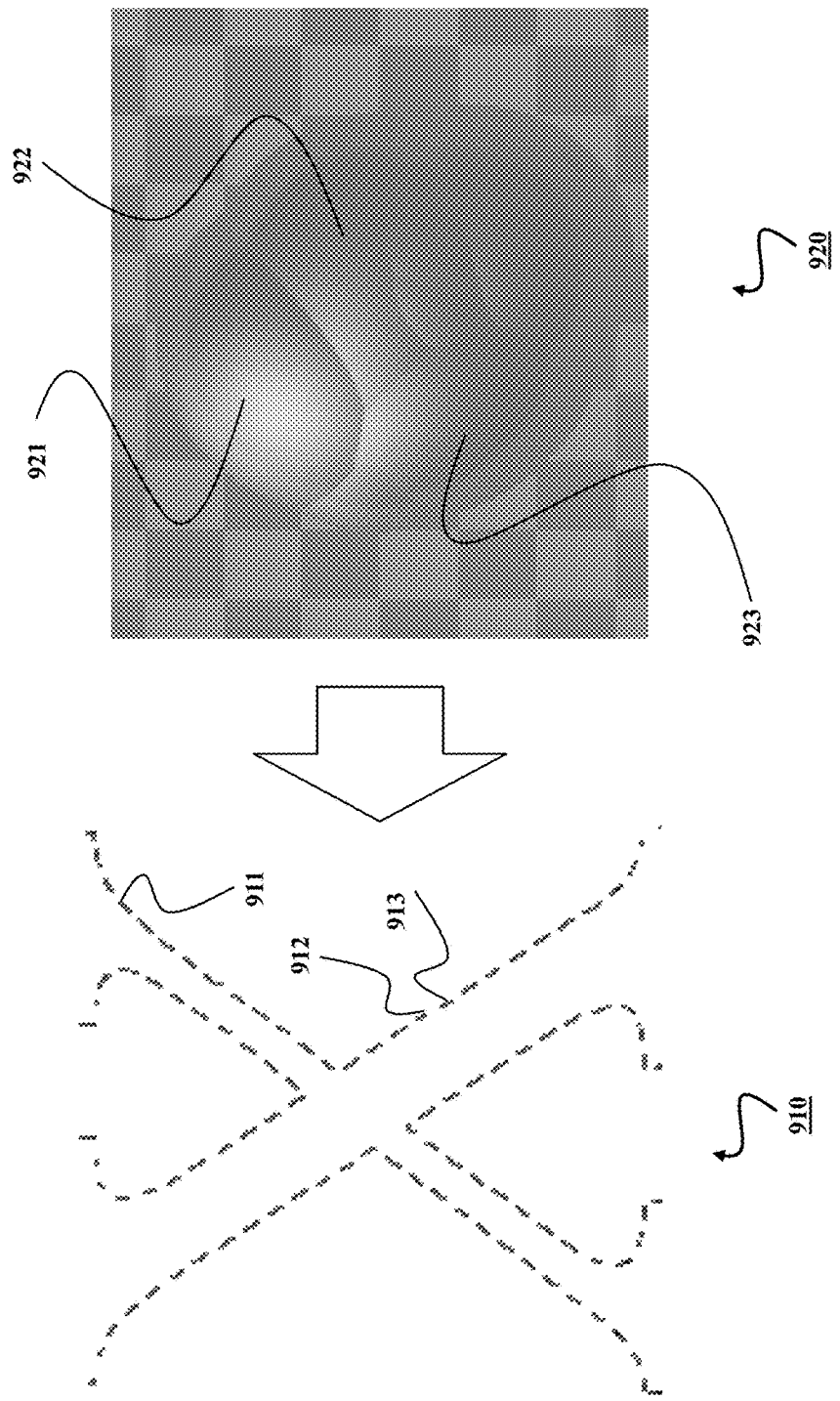
FIG. 9 is a schematic of balancing irradiation according to some embodiments.

FIG. 9 shows a schematic of balancing irradiation according to some embodiments. For example, one embodiment partitions the curve and/or a set of curves 910 into a set of segments 911, 912, 913. The segments can have equal or different lengths. Next, the shapes of the optic that focus the light on the segment of the curve are optimized according to a predetermined irradiation pattern. For example, the shape 921 of the optic 920 is optimized according to the irradiation pattern of the segment 911, the shape 922 is optimized for the irradiation pattern of the segment 912, and the shape 923 is optimized for the irradiation pattern of the segment 913.

For example, the irradiation pattern for each segment can be designed to be uniform along its length and identical. Alternatively, the irradiation pattern for each segment can be designed to be uniform within the segment but different for different segments. For example, in one embodiment, two spatially neighboring segments can have different irradiance.

Figure 10A:
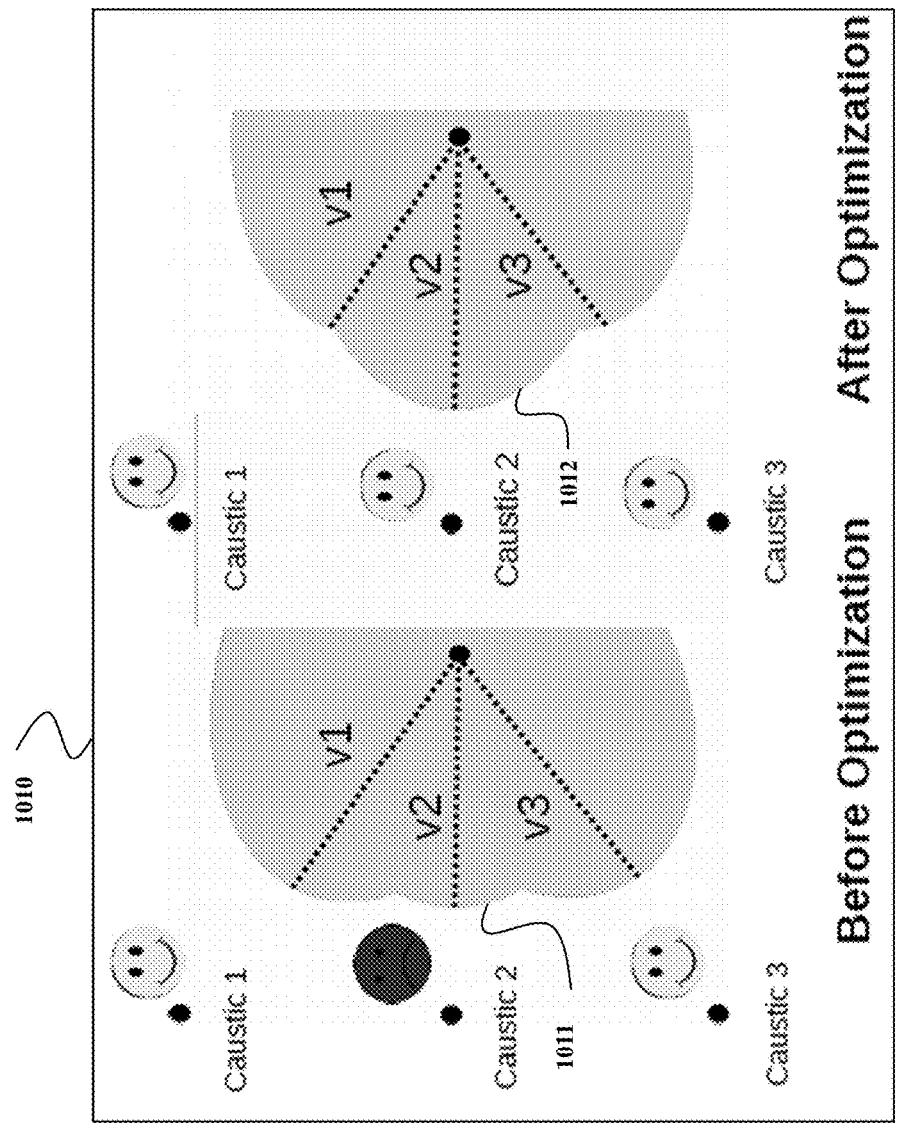
FIG. 10A is a schematic of an optimization procedure for different segments of the caustic and/or for different caustics according to some embodiments.

FIG. 10A shows a schematic of an optimization procedure 1010 for different segments of the caustic and/or for different caustics according to some embodiments. The irradiation balance achieved through optimizing the vertex heights for each component and/or shape of the lens. To that end, some embodiments vary the shape of the plurality of the shapes forming the freeform optical surface. For example, as shown in FIG. 10A, the embodiment can vary protuberance of the shapes reflected in the vertex heights served as an optimization parameter to balance the irradiation. For example, the embodiment can increase the protuberance with respect to a distance to an optical axis of the optic to account to centric light propagation.

Figure 10B:
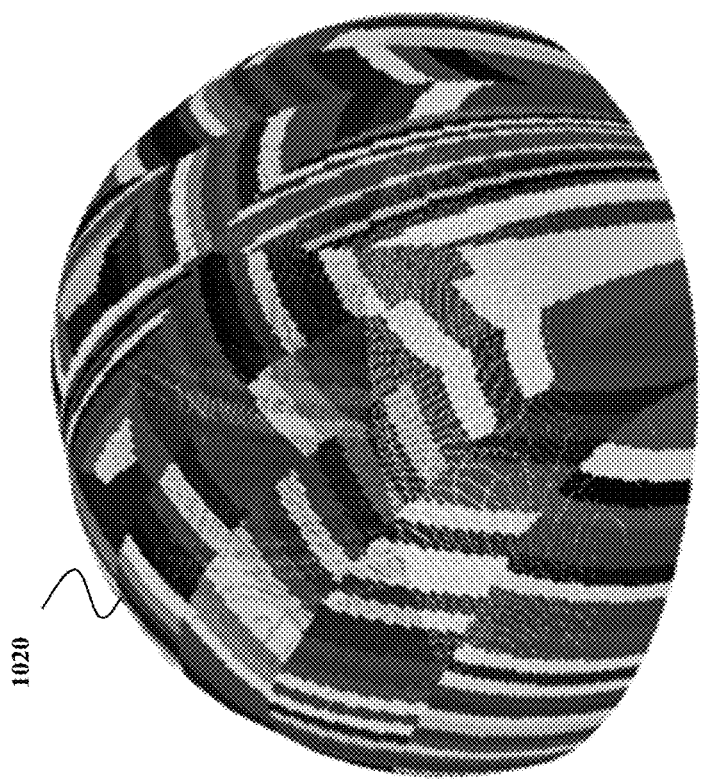
FIG. 10B is an exemplar result of the irradiance optimization according to one embodiment.

FIG. 10B shows an exemplar result of the irradiance optimization according to one embodiment. In this example, the optic 1020 can include hundreds of different shapes combined together to form a single optical surface. The optical surface is continuous if and only if it is the boundary of the union of the shapes enclosed by all of the component surfaces. The irradiant intensity of each caustic is determined by the amount of incident light on its segment, which is determined by the exposed surface area of the shape, which is in turn determined by its one parameter v (vertex height). Therefore, optimization is a matter of adjusting vertex height parameters to obtain a suitably balanced faceting of the combination of the shapes forming the freeform optical surface of the optic.

FIG. 10C shows a pseudo code 1030 of the optimization method for balancing irradiation in the irradiation pattern according to one embodiment. For example, without knowledge of the exact functional forms of each invariant, one embodiment uses a universal procedure for optimization. The embodiment places a (virtual) point emitter at the origin and write each caustic-producing surface j in spherical coordinates to obtain height function $h_j(\theta,\phi,v_j)$.

Given a Boolean combination of these surfaces, the total irradiance on caustic j is $$I_j(v) = \int_{-\pi}^{\pi}\int_0^{\pi/2} \kappa(\theta,\phi) b_j(\theta,\phi,v)\sin\phi\, d\phi\, d\theta, \qquad (5)$$

where $\kappa$ in the directional emittance of the source and $b_j(\ )$ is a binary indicator function with $$b_j(\theta,\phi,v)=1 \text{ if } f\,\forall_{k\neq j}h_j(\theta,\phi v_j) > h_j(\theta,\phi,v_j) > h_k(\theta,\phi,v_k) \text{ else } 0.$$

Let $t_j$ be the desired irradiance on caustic j and define sum-squared error $$E(v) = \sum_j (t_j - I_j(v))^2.$$

This is not differentiable without a priori knowledge of how the facet boundaries depend on v, so one embodiment constructs a smoothed, differentiable version of our problem by replacing binary function $b_j(\cdot)$ with a softmax function $$s_j(\theta,\phi,v) = \frac{\exp\beta h_j(\theta,\phi,v_j)}{\sum_k \exp\beta h_k(\theta,\phi,v_k)},$$

where the denominator sums over all caustic-forming surfaces.

This function satisfies $\lim_{\beta\to\infty} s_j = b_j$; the approximation is accurate even for small $\beta$. Then $$\partial_{v_j}E(v) = 2\beta\Sigma(t_k - I_k)\int_{-\pi}^{\pi}\int_0^{\pi/2}\kappa(\theta,\phi)(s_k(\theta,\phi,v) - \delta_{jk})s_j(\theta,\phi,v)(\partial h_j(\theta,\phi,v_j))\sin\phi d\phi\, d\theta$$

with $\delta_{jk}=1$ if f j=k else 0.

The integral is difficult even for Cartesian ovals; power series approximations are useful. For arbitrary surfaces, one embodiment discretizes and replaces the integral with a sum. To that end, the embodiment partitions the lens surface into a large number of non-overlapping patches, and for each such patch i, integrate the incident light to obtain the flux $\Phi_i$ through the patch. For each caustic-forming surface j, the surface height in the center of patch i is derived as a function of vertex height $v_j$, and denote this $h_{ij}(v_j)$. The patchwise discretization of the binary indicator function is then $$b_{ij}=1 \text{ iff } \forall_{k\neq j}h_{ij}(v_j) > h_{ik}(v_k) \text{ else } 0.$$

and the total irradiance on caustic j is approximated as $$\sum_i \Phi_i b_{ij}$$

with smoothed version $$s_{ij} = \frac{\exp\beta h_{ij}(v_j)}{\sum_k \exp\nu\beta h_{ik}(v_k)}.$$

The total sum-squared error of the smoothed irradiance, $$E(v) = \sum_j \left(t_j - \sum_i \Phi_i s_{ij}\right)^2,$$

can be minimized by gradient descent on the vertex heights $\Delta v_j \propto -\partial_{v_j} E$ for all j with $$\partial_{v_j}E = 2\beta\Sigma_k(t_k\Sigma_i\Phi_i s_{ik})\Sigma_i(s_{ik}-\delta_{jk})s_{ij}\Phi_i\partial_{v_j}h_{ij}(v_j).$$

Here k indexes space-curve segments and i indexes optical surface patches. For lenses, spatial variations in efficiency due to Fresnel losses can be folded in to the calculation by multiplying all instances of $s_{ij}$ by the transmittance of surface j at patch i.

To use this algorithmic machinery, some embodiments break a set of caustic curves into short arc segments, e.g., segments 911-913, assign each segment a caustic-forming surface function, and then jointly optimize all vertex heights to yield a desired segment-by-segment intensity profile.

By rearranging the sums, it is also possible to partition each individual segment into smaller units and minimize the sum-squared error of the irradiance along the arc-length of the space-curve. Since the irradiance profile along each component caustic is fixed by the functional form of its optical surface, this finer-grained partitioning allows the optimization to find combinations of adjacent caustics that yield better uniformity along the space curve.

A similar strategy makes it possible to approximately optimize the extended-source irradiance over the entire projection surface, not just on the space-curve(s). For example, some embodiments start with a point-source optimized surface and assume that small changes to the vertex heights $v_j$ do not change the geometry of light transport, just the assignment of surface patches to caustics. Then, instead of summing over segments of the space-curves, those embodiments sum over patches on the projection surface, using predetermined optical-patch to projection-patch irradiances. The computational burden can be significantly lightened by observing that relatively few patches are "in play" at any given time, and that the problem is amenable to a coarse-to-fine solution.

EXAMPLE

Figure 11:
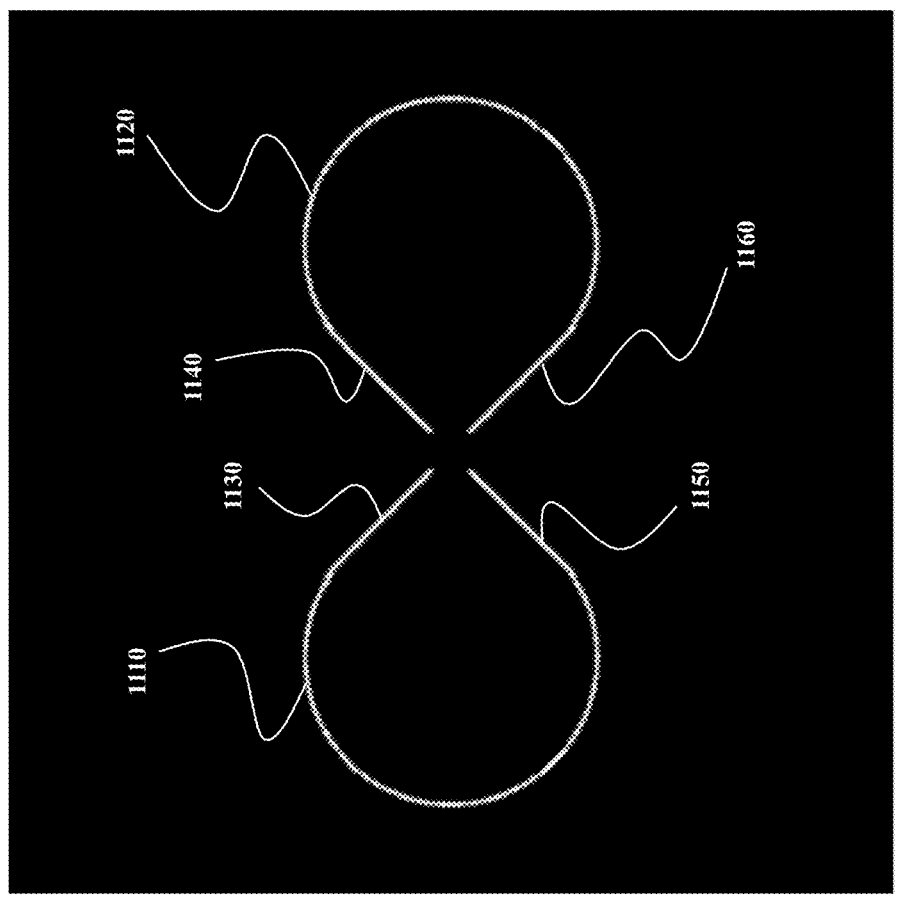
FIG. 11 is an exemplar skeletonized pattern according to an embodiment that projects an infinity symbol.

FIG. 11 shows a schematic of an exemplar skeletonized pattern according to an embodiment that projects the infinity symbol ∞. Skeletonized, this symbol decomposes to a 1D curve including two 270° circular arcs 1110 and 1120 and four crossed straight lines 1130, 1140, 1150, and 1160.

Figure 12:
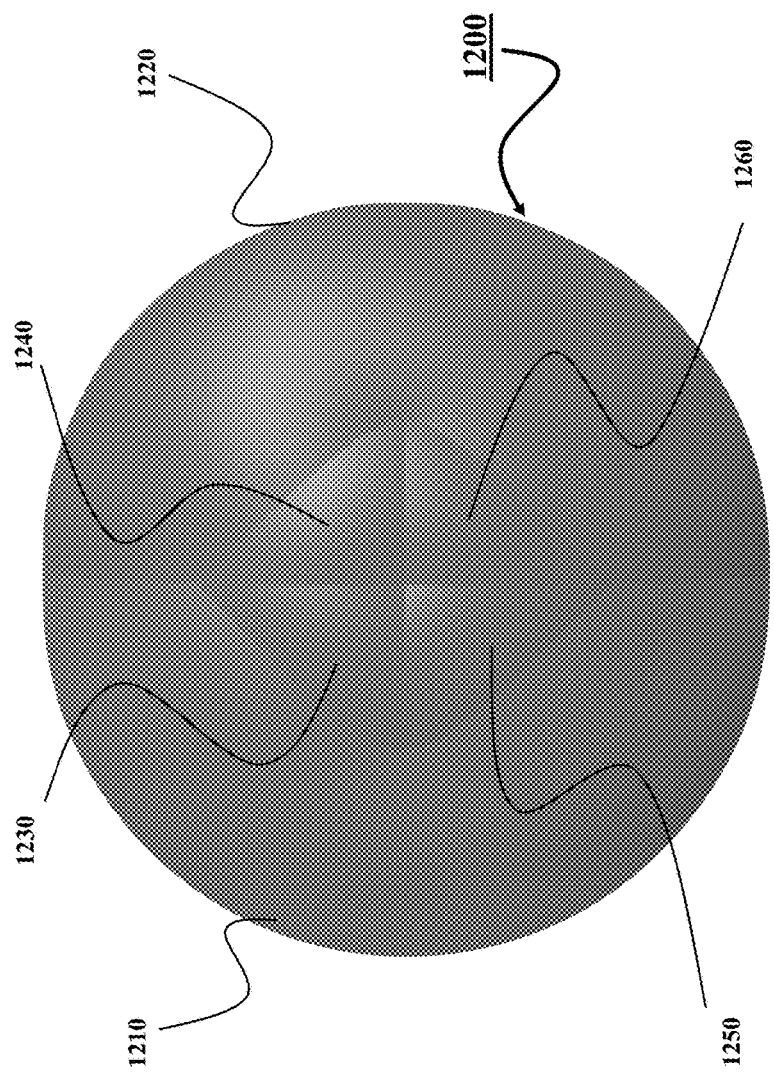
FIG. 12 is an illustration of an optic to produce the irradiation pattern of FIG. 11 when illuminated by a zero-étendue light.

FIG. 12 shows an illustration of an optic 1200, e.g., lens that projects the infinity symbol ∞ at 1 m when illuminated by a light at 45 mm. The cross is made with four line-forming quartics 1230, 1240, 1250, and 1260, positioned with a gap at the center to avoid double exposure when a spatially extended light source is used. The circular arcs are made by two optics 1210 and 1220. The six surfaces are then aimed at their respective parts of the image, superimposed, and vertex-adjusted to balance overall irradiance—a 6-parameter optimization problem.

Figure 13:
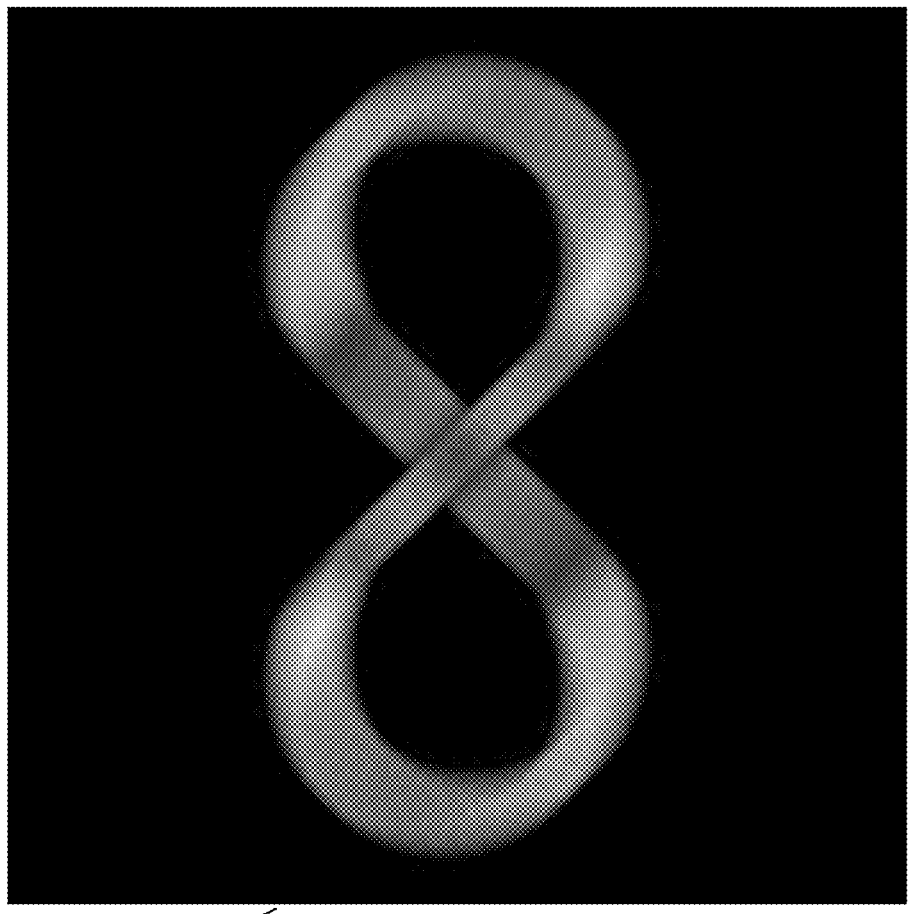
FIG. 13 is a result of illumination of the optic of FIG. 12 with a spatially extended light source.

FIG. 13 show a result of illumination of the optic 1200 with the spatially extended light source, such as LED.

Figure 14:
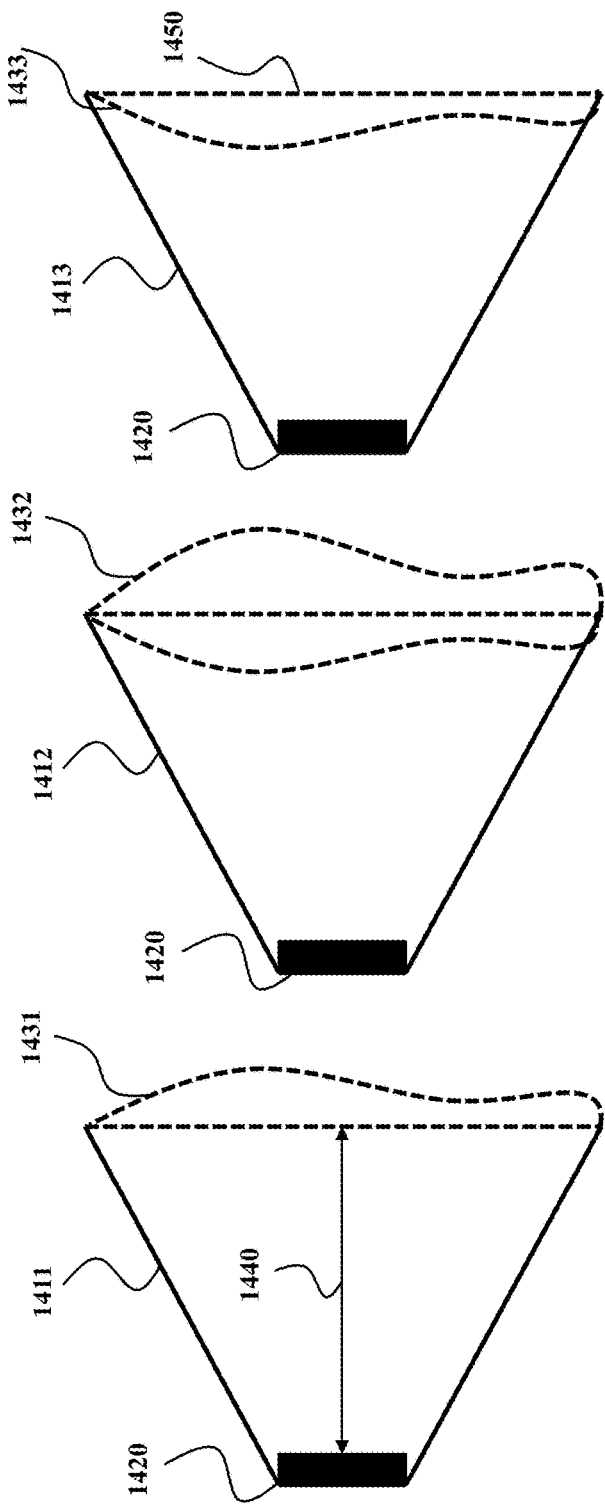
FIGS. 14A, 14B, and 14C are examples of luminaire having the optics determined according to various embodiments of the invention.

FIGS. 14A, 14B, and 14C shows examples of a luminaire having the optics determined according to various embodiments of the invention and an extended light source 1420 arranged in the luminaire to emit the light onto the freeform optical surface. For example, the extended light source 1420 can be arranged at a distance 1440 from the freeform optical surface, and such a distance is considered in the determination of the freeform optical surface. For example, in some embodiments, the shape of the freeform optical surface is a function of the shape of the emitting area of the extended light source and an arrangement of the extended light source with respect to the freeform optical surface.

In different embodiments, the freeform optical surface can be one or double sided. For example, in the exemplar luminaire 1411, the optic 1431 has one sided freeform optical surface. The freeform surface of the optic 1431 is the furthest surface from the light source 1420, and the closest surface is flat. In the exemplar luminaire 1412, the freeform optical surface of the optic 1432 is double sided, i.e., both sides of the optic are freeform optical surfaces. In the exemplar luminaire 1413, the closest to the light source 1420 surface of the optic 1433 has a freeform.

In some embodiments, the luminaire projects the target irradiation pattern on a screen external to the luminaire. Examples of such a screen include a wall or any other flat surface. In alternative embodiment, the optics of luminaire itself can serve as a screen. For example, in one embodiment, a surface 1450 of the optic 1433 opposite to the freeform optical surface is frosted, such that the irradiation pattern is formed on the frosted surface. Additionally or alternatively, the luminaire can have a secondary optics for imaging and display purposes.

Figure 15:
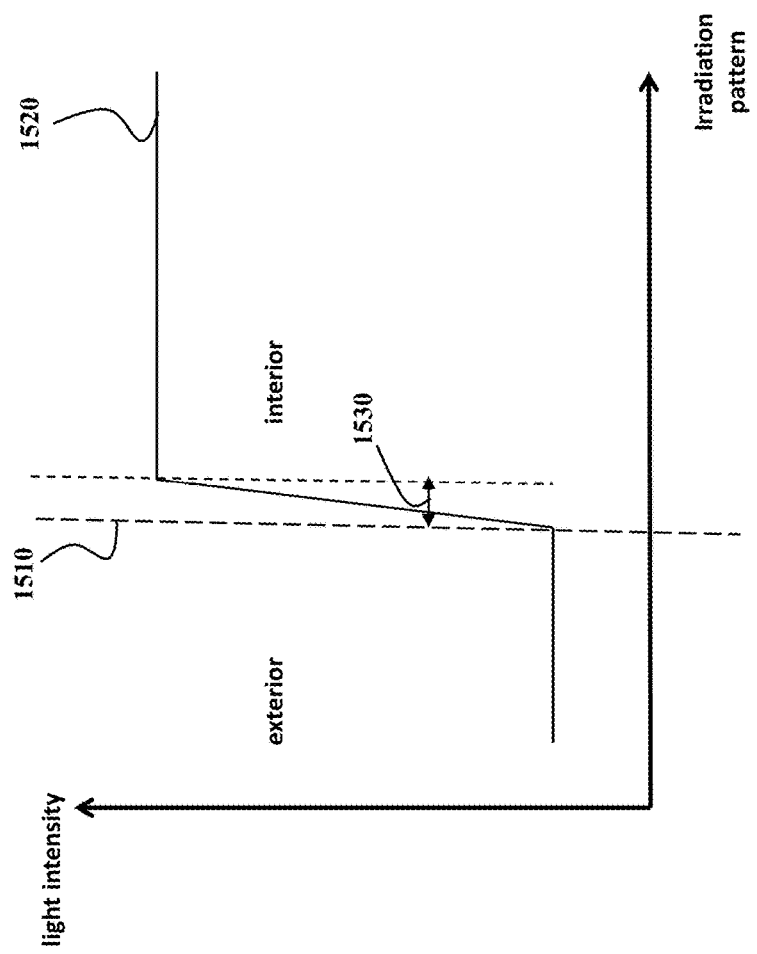
FIG. 15 is a graph of light intensity for a sharp-edged boundary of the irradiation pattern according to some embodiments of the invention.

FIG. 15 shows a graph 1520 of light intensity for a sharp-edged boundary of the irradiation pattern according to some embodiments of the invention. The boundary 1510 separates exterior from the interior of the irradiation pattern. As seen on the graph, the rate of change of the light intensity causes the light intensity to change from minimal to maximal values within a predetermined distance 1530 from the boarder 1510. Such a distance 1530 is found in the focused images and governed by the second law of thermodynamic.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

I claim:

1. An optic having a freeform optical surface transforming incident light emitted by a zero-étendue light source to form an irradiation pattern including a caustic of light rays focused along a curve, wherein the transverse thickness of the illuminated curve is determined by the diffraction limit of the wavelength of the incident light.

2. The optic of claim 1, wherein the curve extends in a plane over the entire length of the curve.

3. The optic of claim 1, wherein the curve extends through a three-dimensional space, such that the curve includes at least two segments lying on different planes.

4. The optic of claim 1, wherein the curve lies on a surface of a three-dimensional geometrical object.

5. The optic of claim 1, wherein the irradiation pattern includes one or multiple curves forming at least one or a combination of a pictogram, an ideogram, a sign, a glyph, and a word.

6. The optic of claim 1, wherein the irradiation pattern includes one or multiple curves forming an asymmetrical low-high beams pattern for illumination of a road surface.

7. The optic of claim 1, wherein the freeform optical surface is formed by a plurality of shapes adjusted to balance irradiance of the light on each part of the irradiation pattern.

8. The optic of claim 1, wherein the freeform optical surface is formed by a combination of a plurality of shapes, wherein protuberance of the shapes increases with respect to a distance to an optical axis of the optic.

9. The optic of claim 1, wherein the curve includes a sequence of segments, each segment has a uniform irradiance along its length.

10. The optic of claim 9, wherein two neighboring segments have different irradiance.

11. The optic of claim 10, wherein all segments have an equal length.

12. The optic of claim 1, wherein the freeform optical surface is formed by a surjection mapping sheets of a space surrounding the optical surface to corresponding points on the curve using a Fermat invariant governing the propagation of the incident light.

13. A luminaire, comprising:
the optic of claim 1; and
a spatially extended light source arranged in the luminaire to emit the light onto the freeform optical surface to produce the irradiation pattern with the curve with increased width or depth and with sharp-edge boarders preventing spilling of the light outside of the irradiation pattern.

14. The luminaire of claim 13, wherein the spatially extended light source includes a light-emitting diode (LED).

15. A method for fabricating an optic, comprising:
determining a freeform optical surface transforming incident light into an irradiation pattern including a caustic of light rays focused along a curve, wherein, when the freeform optical surface is illuminated by a zero-étendue light source, wherein the transverse thickness of the illuminated curve is the size of an Airy disk at the wavelength of the incident light, and wherein, when the freeform optical surface is illuminated by a spatially extended light source, the curve has sharp-edge boarders preventing spilling of the light outside of the irradiation pattern; and
fabricating the optic having the freeform optical surface.

16. The method of claim 15, wherein the determining comprises:
determining the freeform optical surface by a surjection mapping sheets of a space surrounding the curve with corresponding points on the curve using a Fermat invariant governing the propagation of the incident light.

17. The method of claim 15, wherein the irradiation pattern includes multiple curves forming at least one or a combination of a pictogram, an ideogram, a sign, and a glyph.

18. The method of claim 15, wherein the freeform optical surface is formed by a plurality of shapes adjusted to balance irradiant of the light on each part of the irradiation pattern.

19. The method of claim 18, wherein the irradiance of the irradiation pattern is uniform.

20. The method of claim 15, further comprising:
determining the curve by an image-processing a desired irradiation pattern, the image processing includes one or combination of a deblurring, a thresholding, a morphological skeletonization, and a contour-extraction operation.

* * * * *